(12) United States Patent
Procházka, Jr. et al.

(10) Patent No.: US 8,435,915 B2
(45) Date of Patent: May 7, 2013

(54) TITANIUM DIOXIDE CATALYST STRUCTURE FOR PROCESSES UP TO 1000° C AND MANUFACTURING THEREOF

(75) Inventors: Jan Procházka, Jr., KamennéŽehrovice (CZ); Jan Procházka, Sr., KamennéŽehrovice (CZ)

(73) Assignee: Advanced Materials—JTJ S.R.O., KamenneéŽehrovice (CZ)

( * ) Notice: Subject to any disclaimer, the term of this patent is extended or adjusted under 35 U.S.C. 154(b) by 161 days.

(21) Appl. No.: 12/866,328

(22) PCT Filed: Feb. 19, 2009

(86) PCT No.: PCT/CZ2009/000020
§ 371 (c)(1),
(2), (4) Date: Aug. 5, 2010

(87) PCT Pub. No.: WO2009/103250
PCT Pub. Date: Aug. 27, 2009

(65) Prior Publication Data
US 2010/0322832 A1    Dec. 23, 2010

(30) Foreign Application Priority Data
Feb. 21, 2008    (CZ) ................................. PV 2008-95

(51) Int. Cl.
*B01J 27/00*    (2006.01)
*B01J 23/00*    (2006.01)
*C01G 23/047*    (2006.01)

(52) U.S. Cl.
USPC ............ 502/208; 502/350; 423/610; 977/773

(58) Field of Classification Search ................. 423/610; 502/208, 350; 977/773, 775, 776
See application file for complete search history.

(56) References Cited

U.S. PATENT DOCUMENTS

| 6,281,385 B1 | 8/2001 | Ruedinger et al. |
| 6,794,065 B1 | 9/2004 | Morikawa et al. |

(Continued)

FOREIGN PATENT DOCUMENTS

| CZ | 301315 B6 | 1/2010 |
| EP | 0 782 971 A1 | 7/1997 |

(Continued)

OTHER PUBLICATIONS

International Search Report PCT/ISA/210 for PCT/CZ2009/000020 dated Jun. 10, 2010.
Written Opinion (PCT/ISA/237) for PCT/CZ2009/000020 dated Jun. 10, 2010 and Informal Comments dated Jun. 23, 2010.

(Continued)

*Primary Examiner* — Anthony J Zimmer
(74) *Attorney, Agent, or Firm* — Buchanan Ingersoll & Rooney PC

(57) ABSTRACT

The $TiO_2$ catalyst structure consisting of $TiO_2$ nano-particles in the anatase crystal form, doped with 0.05-5 wt % phosphorus on the $TiO_2$ basis, organized in the circular planar aggregates with the specific surface area ranging from 40 to 120 $m^2/g$, suitable for catalytic processes at the temperature up to 800° C., and the $TiO_2$ catalyst structure of with the morphology of the aggregated compact particles, with the specific surface area from 20 to 40 $m^2/g$, suitable for the catalytic processes at the temperature up to 1000° C. Active substances selected from the group consisting of silver, copper, gold, platinum metals, nickel, molybdenum and metal oxides except for alkaline metals oxides can be applied onto the surface of both types of the structure.

12 Claims, 5 Drawing Sheets

U.S. PATENT DOCUMENTS

2002/0169076 A1 11/2002 Takeshi et al.
2003/0181329 A1 9/2003 Tanaka et al.
2008/0045410 A1 2/2008 Prochazka et al.

FOREIGN PATENT DOCUMENTS

EP 1 205 244 A1 5/2002
WO WO 2007/024917 A2 3/2007

OTHER PUBLICATIONS

Czech Search Report for Czech Application No. PV 2008-95 dated Sep. 23, 2008.

Yu, Jimmy C. et al., "Synthesis and Characterization of Phosphated Mesoporous Titanium Dioxide with High Photocatalytic Activity," Chem. Mater., 2003, pp. 2280-2286, vol. 15, No. 11, American Chemical Society.

1 μm

300nm

500nm

400nm

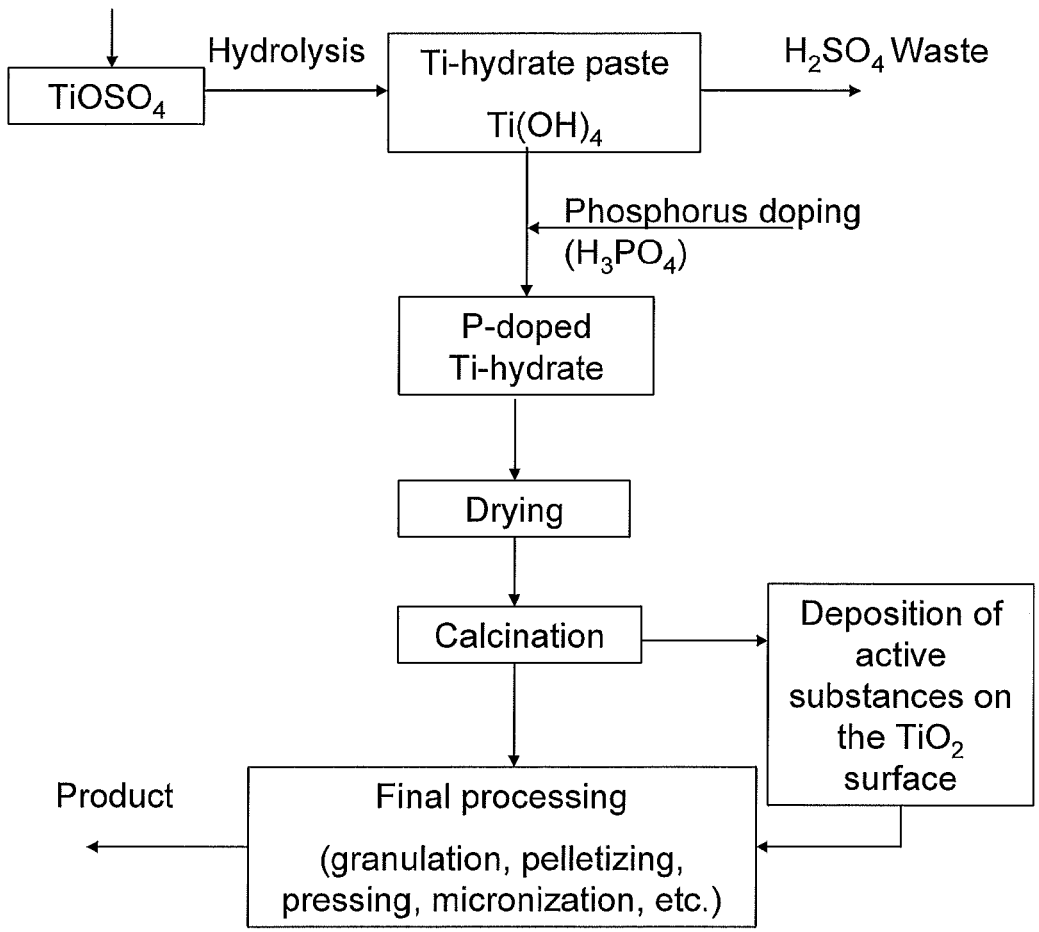

TITANIUM DIOXIDE CATALYST STRUCTURE FOR PROCESSES UP TO 1000° C AND MANUFACTURING THEREOF

TECHNICAL FIELD

The invention relates to the planar $TiO_2$ catalyst structure suitable for the catalytic processes at the temperature up to 1000° C.

BACKGROUND OF THE INVENTION

More efficient novel catalyst structures and catalyst support structures for heterogeneous catalysis are more and more meaningful considering the growing energy cost. The composition of the active substance is essential for the efficiency of catalyst structure, but its surface area and accessibility of the surface are also important. It is not easy to secure these two properties. Except for the final macro-shape, which is created for instance by pelletization, it is the inner structure, its porosity and the geometrical configuration of particles that have an impact on the surface accessibility.

The choice of the proper catalyst support structure often plays a crucial role especially in the case where the creation of a chemical bond between the carrier and the catalyst is necessary. For example this is the case of the system of $SiO_2$ or $TiO_2$ (supporting structure) and $MoO_3$ (catalyst).

The synthesis problems and the thermal resistance of the catalyst structure are often important factors limiting its usability. The preparation or application of a catalyst often requires relatively high temperatures at which the structure can sinter, densify, lose the specific surface area, moreover an undesirable chemical reaction between the catalyst support structure and the catalyst can occur.

The $TiO_2$ nanoparticles in the hydrated or anatase form are especially sensitive to the thermal cycles exceeding 300° C.

Despite the attractiveness of the $TiO_2$ anatase catalyst structures, their preparation using the sulfate process, i.e. hydrolysis of $TiOSO_4$ creating the titanium hydrate of the composition approximately $Ti(OH)_4$, which is consecutively calcined, has serious drawbacks, such as the poor heat resistance accompanied by the fast loss of the specific surface area during the heat exposure and finally the crystal phase transformation into rutile. Materials prepared by the sulfate process often show a high content of residual hydrate and sulfur, which don't disappear even at temperatures exceeding 450° C.

SUMMARY OF INVENTION

The $TiO_2$ catalyst structure for the catalytic processes at the temperature up to 800° C. eliminates the mentioned disadvantages. It consists of $TiO_2$ nanoparticles in the anatase crystal form, doped with phosphorus in the range of 0.05-5 wt % P on the $TiO_2$ basis. The nanoparticles are organized into the planar circular aggregates, which specific surface area varies from 40 to 120 $m^2/g$.

The $TiO_2$ catalyst structure preferably consists of $TiO_2$ nanoparticles in the anatase crystal form, doped with 0.55-5 weight % of phosphorus on the $TiO_2$ basis.

The $TiO_2$ catalyst structure for the catalytic processes at the temperature up to 1000° C. consists of $TiO_2$ nanoparticles in the crystalline form of anatase, doped with 0.05-5 wt % of phosphorus on the $TiO_2$ basis, with the morphology of aggregated compact particles with the specific surface area 20-40 $m^2/g$.

The catalyst structure of $TiO_2$ for the catalytic processes at the temperature up to 1000° C. preferably consists of $TiO_2$ nanoparticles in the anatase crystal form, doped with 0.55-5 wt % of phosphorus on the $TiO_2$ basis.

The use of the $TiO_2$ catalyst structure is convenient for many catalytic processes, where according to the invention, the active substances selected from the group consisting of silver, copper, gold, platinum metals, nickel, molybdenum and metal oxides with the exception of alkaline metal oxides are deposited on the surface of the $TiO_2$ structure.

According to the invention, the manufacturing method of the catalyst structure for processes at the temperature up to 800° C. is based on the addition of phosphorus compound in the amount of 0.05-5 wt % of phosphorus on the $TiO_2$ basis to the titanium hydrate paste, prepared by the hydrolysis of titanum oxysulphate. The intermediate product is dried and consequently calcined at the temperature 350-900° C., preferably at 450-800° C. for the period of time from 1 to 24 hours. The obtained catalyst structure is in the form of powder.

According to the invention, the manufacturing method of the catalyst structure for processes at the temperature up to 1000° C. is based on the addition of phosphorus compound in the amount of 0.05-5 wt % of phosphorus on the $TiO_2$ basis to the titanium hydrate paste, prepared by the hydrolysis of titanum oxysulphate. The intermediate product is dried and consequently calcined at the temperature 500-1000° C., preferably at 450-800° C. for the period of time from 1 to 24 hours. The obtained catalyst structure is in the form of powder.

The phosphorus compound is selected from the group of substances consisting of phosphoric acid and water-soluble phosphates.

It is convenient to apply the active substances onto the powder of this $TiO_2$ catalyst structure.

It is possible to process the obtained powder of the catalyst structures, possibly with the active substances, into the shape required for catalysis by pressing, granulation, pelletization, flaking, micronizing or by another common technique.

The catalyst structures consisting of the circular, planar aggregates of $TiO_2$ nanoparticles in the anatase form, with the specific surface 40-120 $m^2/g$ can be used for the long-term applications at the temperature up to 800° C.

The catalyst structures consisting of the aggregates of compact $TiO_2$ nanoparticles in the anatase form, with the specific surface 20-40 $m^2/g$ can be used for the short-term applications at the temperature up to 1000° C.

The catalyst structures can be conveniently used for the catalytic destruction of nitrogen oxides $NO_x$ from the diesel aggregates and exhaust gasses. They can also be used for the photocatalytic applications or as a catalyst support structure for the active substances selected from the group consisting of silver, copper, gold, platinum metals, nickel, molybdenum and metal oxides with the exception of alkaline metals oxides.

The catalyst structures are in the crystal phase of anatase. The anatase nanoparticles are organized in roughly circular planar formations. The circular planar formations consist of individual nanoparticles which size varies typically from 5 to 25 nanometers. The average radius size of planar circular unit, on which the nanoparticles are organized, is usually 30-50 nanometers and its thickness varies from 5 to 25 nanometers (it corresponds to the size of the individual anatase nanoparticles). Some of the units are interconnected forming larger units with the size up to 100 nanometers. Thanks to its morphology, the mentioned planar nano-anatase structure possess very high specific surface area, high porosity, excellent accessibility of the surface and significantly higher thermal stability than the undoped $TiO_2$.

The organization of nanoparticles aggregated into the planar circular structure was surprisingly discovered when a small amount of phosphorus was added as a dopant to the paste of titanium hydrate which was consequently calcined. Whereas the undoped material simply fuses into large aggregates creating a mixture of nanoparticles with a low specific surface area, broad particle size distribution and without any signs of an organization into a planar circular substructure, the doped material is organized in the circular planar units after the calcination at the same temperature.

Moreover the addition of phosphorus evidently stabilizes the crystalline phase of anatase and shifts its thermal transformation into the rutile up to higher temperatures.

It was experimentally proven that this structure forms during the thermal processing of phosphorus doped titanium hydrate $Ti(OH)_4$ at the temperatures above 350° C. The titanium hydrate is made from the titanium oxysulphate $TiOSO_4$ precursor. The specific surface area of the titanium hydrate paste which is the input material for the reaction typically varies from 200 to 350 $m^2/g$.

The exact reason is not known; however, using of the titanium hydrate prepared differently, for instance by the hydrolysis of titanium oxychloride, in combination with the phosphorus doping, doesn't produce the morphology of aggregates organized in the planar circles.

The stages of the formation, existence and transformation of the circular planar morphology of the aggregates are schematically depicted in the FIG. 1. FIG. 2A shows a SEM photograph of the mentioned aggregates suggestive of little flat rings. FIG. 2B captures the transformation of the circular planar aggregates into the compact nano-particles of anatase with the average individual particle size corresponding approximately to the original size of the radius of the circular planar structure. From the FIGS. 2A and 2B it is obvious that the change of morphology is accompanied by a significant decrease of the specific surface area of the nano-anatase product. The temperature at which the planar circular structure transforms into the morphology of compact particles is specific for the particular content of phosphorus. The phosphorus concentration stabilizes the circular morphology at high temperatures, at which the undoped material completely sinters, loses the specific surface area or even changes the crystal phase.

To create the planar circular nano-anatase structure, it is convenient using the phosphorus level in the range from 0.05 to 5 wt % with the optimal phosphorus level from 0.1 to 1 wt % on the $TiO_2$ basis.

If the amount of phosphorus is zero, the particles spontaneously fuse together and a broad particle size distribution is created as early as the hydrate converts into the oxide. Without phosphorus the organized planar circular morphology is not created.

At the low content of phosphorus between 0.05-0.1 wt % on the $TiO_2$ basis, the planar circular structure of nano-anatase aggregates is stable approximately in the temperature range from 500 to 600° C.

Another increase of the phosphorus content to 1 to 5 wt % on the $TiO_2$ basis shifts the temperature of transformation of the circular planar structure higher to 650 to 800° C.

If we increase the calcination temperature approximately by another 100 to 250° C. higher, another change of morphology occurs due to the intensive fusion of particles into the large, hard-fused aggregates, similar to these in the undoped product. We will see a collapse of the specific surface area and creation of the broad particle size distribution. The typical product of this fusion is shown in the FIG. 3. The hard-sintered particles of anatase are mostly outside the nanosize range. The specific surface of the fused products is typically below 20 $m^2/g$, most frequently from 5 to 15 $m^2/g$. Despite its disadvantages it is this type of hard-sintered products, which is now used for the catalyst structures for variety of syntheses in the industry.

The manufacturing of the above mentioned products with the planar circular nano-anatase structure is based on the preparation of titanium hydrate $Ti(OH)_4$ paste via hydrolysis of titanium oxysulphate $TiOSO_4$, addition of a compound containing phosphorus, drying the doped paste and consequential calcination in the temperature range from 350° C. to 900° C. for the period of time from 1 to 24 hours.

In the case of preparing the titanium oxysulphate from an ore already containing phosphorus, for example ilmenite, the amount of phosphorus is just brought to the required level with the appropriate quantity of the phosphorus compound.

The further increase of the calcination temperature by 100° C. to 200° C. produces the porous structures consisting of compact nano-particles of anatase, created by the fusion of the planar circular aggregates. These structures have an outstanding thermal stability and still possess relatively high specific surface area. Phosphoric acid or a phosphate, soluble in water, can be conveniently used for doping the titanium hydrate paste. The flow sheet diagram of manufacture is shown in the FIG. 7.

Even though the morphology of planar circular aggregates with the significantly higher accessibility of the surface is optimal for use as a catalyst, the structure of compact nano-particles of anatase, created from the circular structure, is also usable. This concerns especially applications, where the catalyst is exposed to the long-term high temperatures up to 850° C. and requires the ability to resist short-term temperatures as high as 1000° C. without a significant loss of the specific surface area.

The specific surface area of the materials with the morphology of circular planar aggregates is usually well above 40 $m^2/g$. It typically ranges from 50 to 120 $m^2/g$ (the specific surface area is determined from the adsorption isotherms of nitrogen at 77K and is referred to as BET). The important characteristic of this morphology is the high specific surface area and also good accessibility of the surface.

The materials with the structure of compact particles, created from the circular aggregates, usually have the specific surface area higher than 20 $m^2/g$, and frequently it varies from 25 to 35 $m^2/g$. These materials show a low content of sulfur, which is convenient for functioning as a catalyst structure. From the viewpoint of its use as a catalyst structure, this morphology has high enough and accessible surface (FIG. 6). Fifty percent of the $TiO_2$ surface is typically lost in the connections between sintered particles contrary to the planar circular structure where the $TiO_2$ open (accessible) surface is tens of percent higher.

Very high loss of the specific surface area is typical for the third phase of the fusion. It usually drops down under 15 $m^2/g$. Also the degree of sintered particles, where the ratio of the open $TiO_2$ surface to the surface used by sintered connections between the particles drops down (FIG. 3). The further heat treatment above this limit results in the $TiO_2$ crystal phase transformation from anatase into rutile.

The open morphology of these products is convenient for deposition of the active substances on the $TiO_2$ surface such as platinum and platinum metals, nickel, cobalt, silver, copper, gold and metal oxides except for alkaline metal oxides. For example, water solution of ions of these active substances can be used to prepare a suspension with the $TiO_2$ catalyst structure, which is further dried e.g. in a spray dryer and eventually calcined. Thanks to the open morphology and accessibility of the surface, a suspension of circular planar catalyst structure is convenient for the deposition of the active substances by variety of methods such as precipitation, complexing, gas phase vapor deposition, or thermal decomposition on the surface of the $TiO_2$ structure, and similar.

The products manufactured by the described method show a high photocatalytic activity. They can be conveniently used not only as a catalyst structure but also as a photocatalyst.

The described intermediate products can be directly used in the form of loose powder or they can be further processed into the desired form by micronization, pressing, granulation, milling or other processes typical for making catalysts.

DESCRIPTION OF THE DRAWINGS

FIG. 7 shows a flowchart of the production process of the nano-anatase circular planar structure and the following processing into the specific products.

EXAMPLES

The following examples illustrate but do not limit the presented invention.

Example 1

Figure 1:
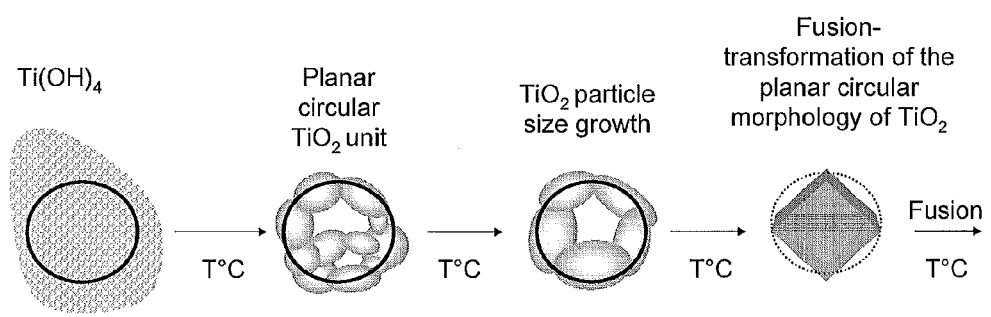
FIG. 1 shows schematically the process of formation of the $TiO_2$ nano-anatase circular planar aggregates from the titanium hydrate, an interval of their existence and alteration of their morphology into the compact particles during elevation of the calcination temperature. The diameter of the circle mark is 30 nm.
Figures 2A, 2B:
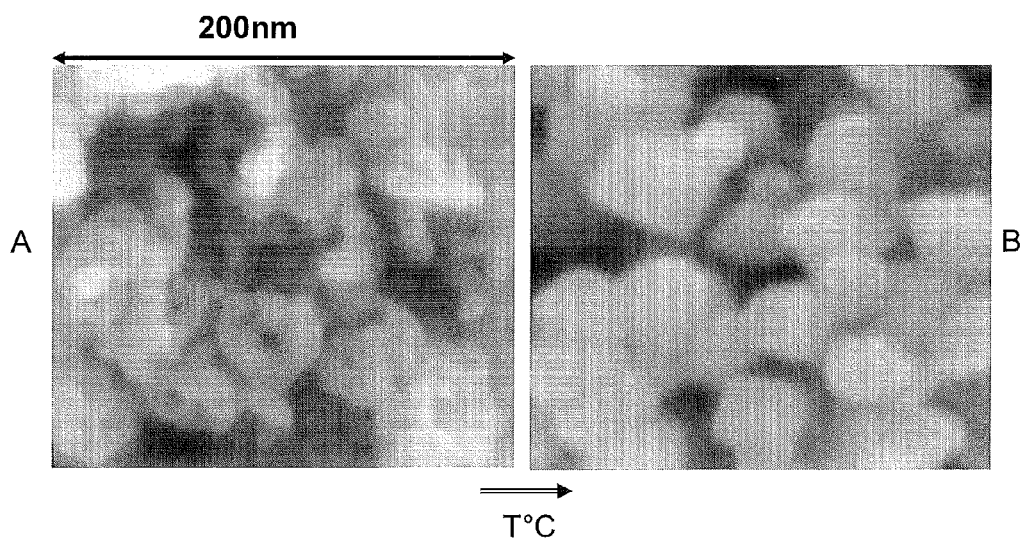
FIG. 2 shows electron scanning microscope (SEM) micrographs on the same scale:
  A) Nanoparticles $TiO_2$-anatase organized in the circular planar aggregates, typically from 20 to 50 nm in size
  B) The compact nanoparticles of $TiO_2$-anatase created by heating the circular planar aggregates above 800° C. The typical size of the created compact particles typically varies from 20 to 50 nm and correlates roughly to the diameter of the original planar aggregates before the fusion.
Figure 3:
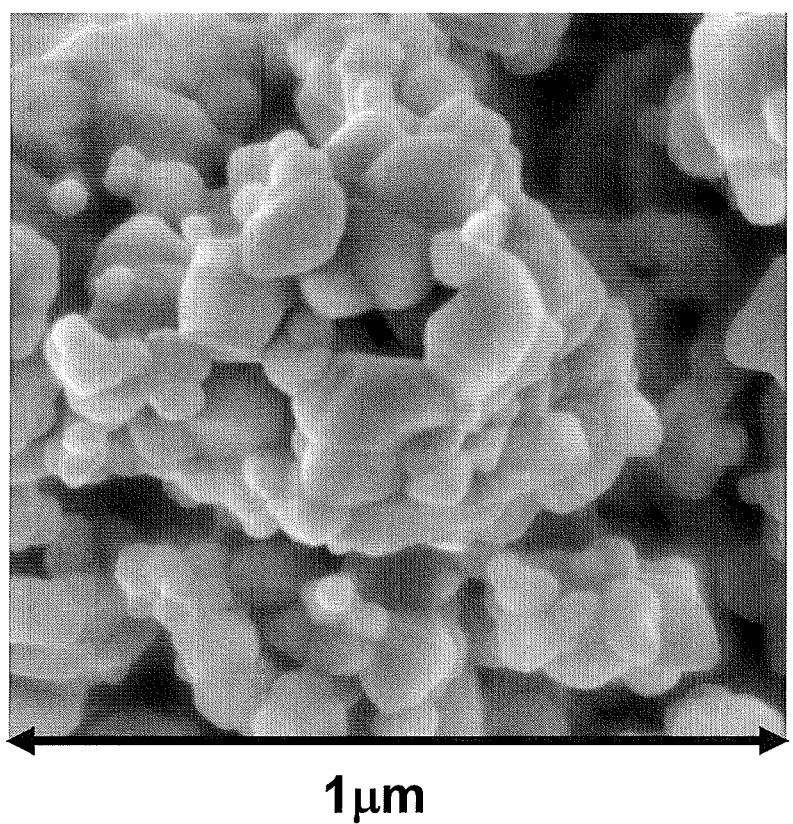
FIG. 3 shows a scanning electron microscope (SEM) photograph of the fused nano-anatase doped with phosphorus after the calcination at the temperature above 900° C.
Figure 4:
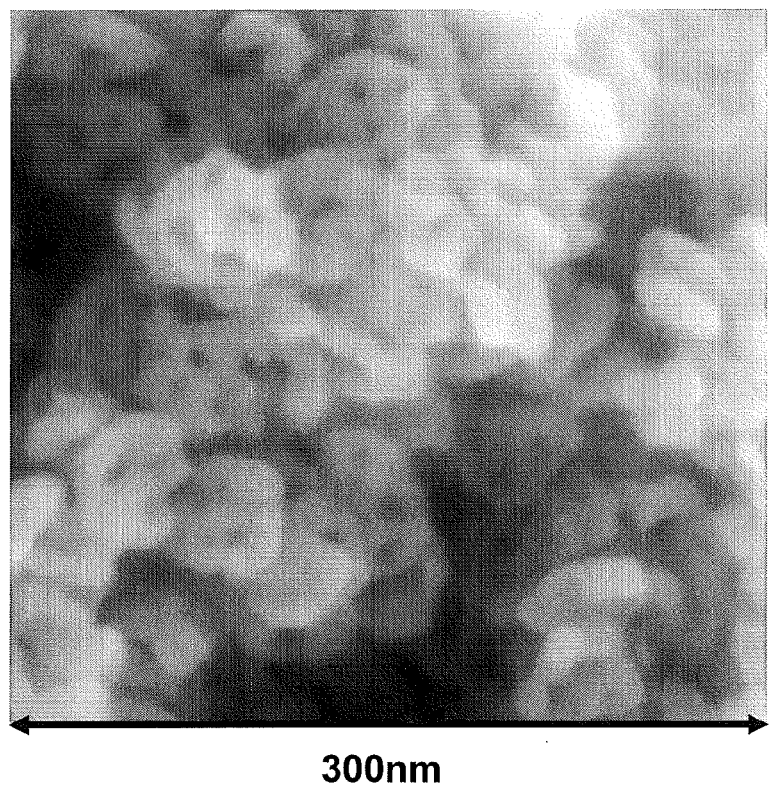
FIG. 4 shows a SEM photograph which depicts the circular planar structure of nano-anatase prepared according to example 1.

A concentrated solution of titanium oxysulphate $TiOSO_4$ was hydrolyzed by addition of hot water and by bubbling hot water vapor through the solution. Titanium hydrate of an approximate composition $Ti(OH)_4$ was obtained and separated from the sulphuric acid solution by sedimentation and filtration. The amount of 1% phosphoric acid corresponding to 1 wt % of phosphorus in $TiO_2$ was added to the filtered titanium hydrate paste. The suspension was properly mixed and after that it was dried at the temperature 150° C. The dry intermediate product was further calcined at the temperature 600° C. for 10 hours. The obtained product was a soft white powder with the specific surface area (BET) 77 $m^2/g$. The average particle size 9 nm was determined from the roentgen diffraction (XRD) and calculated using the Scherrer's equation. The particle size and the circular planar morphology of this product are noticeable from FIG. 4. The sample shows high photocatalytic activity. If 1 wt % $AgNO_3$ solution is applied to the $TiO_2$ surface, silver rapidly develops on it, showing one of the ways of applying the active substance for catalysis onto the $TiO_2$ structure. This structure is stable at the temperature up to 750° C.

Example 2

Figure 5:
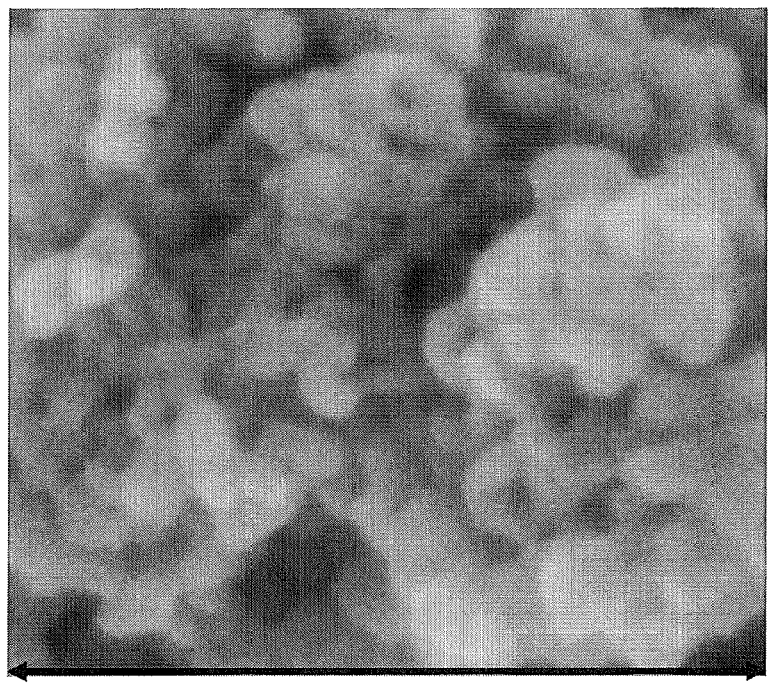
FIG. 5 shows a SEM photograph which depicts the circular planar structure of nano-anatase prepared according to example 2.

An amount of 0.5% phosphoric acid corresponding to 0.5 wt % of phosphorus in $TiO_2$ was added to the titanium hydrate paste, created by the hydrolysis of $TiOSO_4$. The suspension was properly mixed and after that it was dried at the temperature 150° C. The dry intermediate product was further calcined at temperature 650° C. for 10 hours. The obtained product is a soft white powder with specific surface area (BET) 50 $m^2/g$ and 22 nm particle size that was determined from roentgen diffraction and calculated using the Scherrer's equation. The product consists of relatively large nano-particles and possesses the circular morphology, which is noticeable in FIG. 5.

Example 3

Figure 6:
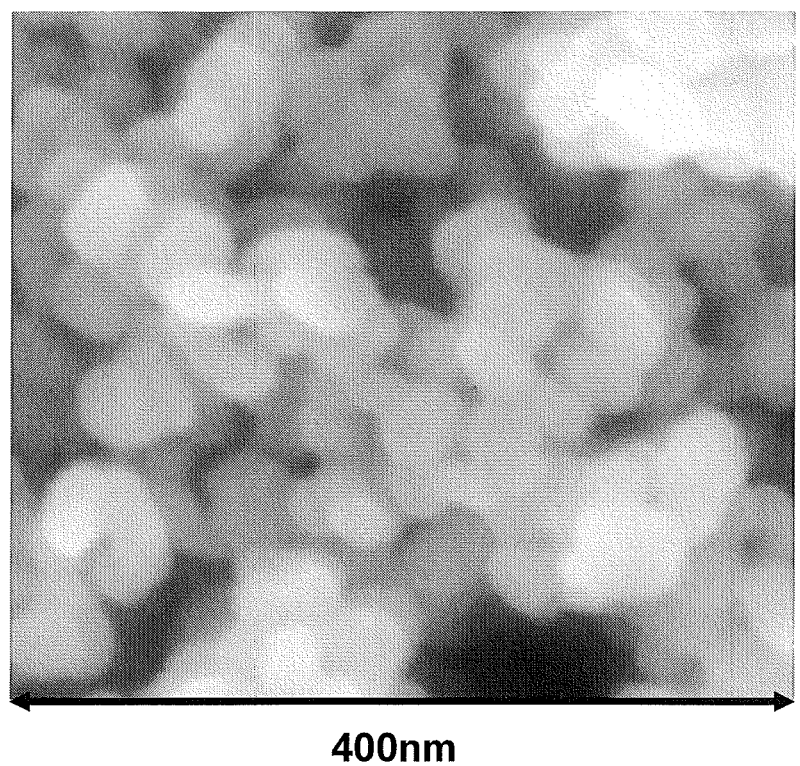
FIG. 6 shows a SEM photograph which depicts the structure of nano-anatase compact particles prepared according to example 3.

The amount of 0.1% phosphoric acid corresponding to 0.1 wt % of phosphorus in $TiO_2$, was added to the titanium hydrate paste. The suspension was properly mixed and after that it was dried at the temperature 150° C. The dry intermediate product was further calcined at 700° C. for 10 hrs. The obtained product is a soft white powder with the specific surface area (BET) 30 $m^2/g$. The average particle size 30 nm was determined from roentgen diffraction and calculated using the Scherrer's equation. The created material shows the morphology of compact particles, as it is noticeable in FIG. 6. For comparison, materials doped with 1 to 5 wt % of phosphorus were calcinated in parallel. They still show the circular planar morphology of aggregates with the double specific surface area compared to the material described above.

Industrial Utilization

The catalyst structures described in this invention have significantly larger and more accessible surface, high thermal resistance, phase purity of anatase and show easier processing of the powder than the undoped $TiO_2$. These nano-structures are a good substitution of the materials which are industrially used today as the catalyst structures. There we can expect an improvement of the process effectiveness. The nano-anatase catalyst structures are suitable for applications which require a high thermal resistance. The thermal resistance of these structures significantly widens the use of $TiO_2$ in processes for degradation of nitrogen oxides NO from diesel aggregates and exhaust gasses. It is also convenient to use the structures created by this method for photocatalysis.

The invention claimed is:
1. A $TiO_2$ catalyst structure for catalytic processes at temperatures up to 1000° C. in a form of powder comprising $TiO_2$ nano-particles in an anatase crystal form doped with phosphorus, wherein the phosphorus is 0.05-5 wt % of the $TiO_2$ nano-particles, wherein a specific surface area of the nano-particles in the anatase crystal form is from 20 to 120 $m^2/g$, wherein the nanoparticles in the anatase form are made by drying and calcination of an intermediate product in a temperature range from 350 to 1000° C. for 1 to 24 hours, wherein the intermediate product is made by addition of a phosphorus compound to a titanium hydrate paste prepared by hydrolysis of titanium oxysulphate.

2. The $TiO_2$ catalyst structure of claim 1, for catalytic processes at temperatures up to 800° C., wherein the nanoparticles in the anatase form are organized into circular planar aggregates with a specific surface area from 40 to 120 $m^2/g$, wherein the nanoparticles in the anatase form are made by drying and calcination of the ntermediate product in a temperature range from 350 to 900° C. for 1 to 24 hours.

3. The $TiO_2$ catalyst structure of claim 2, comprising $TiO_2$ nano-particles made by drying and calcination of the intermediate product in a temperature range from 450 to 800° C. for 1 to 24 hours.

4. The $TiO_2$ catalyst structure for the catalytic processes at the temperatures up to 1000° C., according to claim 1, consisting of $TiO_2$ nano-particles in the anatase crystal form with the morphology of aggregated compact particles with the specific surface area from 20 to 40 $m^2/g$, wherein the nanoparticles of anatase are made by drying and calcination of the intermediate product in the temperature range from 500 to 1000° C. for 1 to 24 hours.

5. The $TiO_2$ catalyst structure of claim 1, wherein the phosphorus compound is selected from the group consisting of phosphoric acid and water soluble phosphates.

6. The $TiO_2$ catalyst structure of claim 1, wherein active substances are applied to the surface area of the $TiO_2$ catalyst structure.

7. The $TiO_2$ catalyst structure claim 6, wherein the active substances are selected from the group consisting of silver, copper, gold, platinum metals, nickel, molybdenum and metal oxides with the exception of alkaline metals oxides.

8. A method of manufacturing of the $TiO_2$ catalyst structure of claim 1 wherein a powder of the $TiO_2$ catalyst structure or the catalyst structure with active substances is processed by pressing, granulation, pelletization, flaking, or by micronizing.

9. A method of manufacturing of the $TiO_2$ catalyst structure of claim 2 wherein a powder of the obtained catalyst structure or the catalyst structure with active substances is processed by pressing, granulation, pelletization, flaking, or by micronizing.

10. A method of manufacturing of the $TiO_2$ catalyst structure of claim 3 wherein a powder of the obtained catalyst structure or the catalyst structure with active substances is processed by pressing, granulation, pelletization, flaking, or by micronizing.

11. The method of manufacturing of the $TiO_2$ catalyst structure for the catalytic processes according to claim 4 wherein a powder of the obtained catalyst structure or the catalyst structure with the active substances is processed by pressing, granulation, pelletization, flaking, micronizing or by another common technique.

12. A method of manufacturing of the $TiO_2$ catalyst structure of claim 5 wherein a powder of the obtained catalyst structure or the catalyst structure with active substances is processed by pressing, granulation, pelletization, flaking, or by micronizing.

* * * * *